(12) United States Patent
Jaussaud et al.

(10) Patent No.: US 12,552,114 B2
(45) Date of Patent: Feb. 17, 2026

(54) RTM INJECTION METHOD AND MOULD USING SYMMETRIC ANTI-PINCHING SECTORS

(71) Applicant: SAFRAN AIRCRAFT ENGINES, Paris (FR)

(72) Inventors: Raoul Jaussaud, Moissy-Cramayel (FR); Hubert Jean Marie Fabre, Moissy-Cramayel (FR); Brian Jensen, Bow, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 359 days.

(21) Appl. No.: 18/000,482

(22) PCT Filed: May 26, 2021

(86) PCT No.: PCT/FR2021/050959
§ 371 (c)(1),
(2) Date: Apr. 21, 2023

(87) PCT Pub. No.: WO2021/245340
PCT Pub. Date: Dec. 9, 2021

(65) Prior Publication Data
US 2025/0144897 A1   May 8, 2025

Related U.S. Application Data

(60) Provisional application No. 63/034,549, filed on Jun. 4, 2020.

(51) Int. Cl.
*B29C 70/54*   (2006.01)
*B29C 70/48*   (2006.01)
*B29L 31/00*   (2006.01)

(52) U.S. Cl.
CPC .............. *B29C 70/54* (2013.01); *B29C 70/48* (2013.01); *B29L 2031/7504* (2013.01)

(58) Field of Classification Search
CPC ....... B29C 70/54; B29C 70/48; B29C 33/301; B29C 33/302; B29C 33/306
See application file for complete search history.

(56) References Cited

U.S. PATENT DOCUMENTS 2,683,912 A * 7/1954 Serrell .................... B28B 21/88
249/105
8,322,971 B2   12/2012 Coupe et al.
(Continued)

FOREIGN PATENT DOCUMENTS

CN       108367462 A      8/2018
JP       2007105979 A     4/2007
WO  WO-2021048486 A1 *   3/2021  ........... B29C 70/549

OTHER PUBLICATIONS

International Search Report with English Translation issued in International Application No. PCT/FR2021/050959 on Sep. 15, 2021 (4 pages).

(Continued)

*Primary Examiner* — Yunju Kim
(74) *Attorney, Agent, or Firm* — Bookoff McAndrews, PLLC (57) ABSTRACT

An injection mold for the manufacture of an axisymmetric part of composite material comprising a mandrel supporting a fibrous preform and comprising an annular wall, and a plurality of counter-mold angular sectors assembled to the mandrel and intended to close the mold and to compact the fibrous preform wound on the mandrel. Each angular sector comprises an annular base intended to come into contact with the fibrous preform. The plurality of angular sectors includes a first series of angular sectors and a second series of angular sectors, first and second lateral edges of the first (Continued)

series of sectors each including a protruding lower portion, the first and the second lateral edges of the second series of sectors each including a recessed lower portion.

6 Claims, 10 Drawing Sheets

(56) References Cited

U.S. PATENT DOCUMENTS

| | | |
|---|---|---|
| 2007/0182065 A1 | 8/2007 | Adams et al. |
| 2012/0038086 A1 | 2/2012 | Pini et al. |
| 2012/0112377 A1* | 5/2012 | Bennett .................. B29C 70/32 |
| | | 425/388 |
| 2013/0087955 A1 | 4/2013 | Plante et al. |
| 2016/0009003 A1 | 1/2016 | Chauvin |
| 2018/0370082 A1 | 12/2018 | Mathon et al. |
| 2022/0402223 A1* | 12/2022 | Guillot .................. B29C 70/549 |

OTHER PUBLICATIONS

First Search issued in corresponding application CN115697682A, issued Mar. 29, 2025.

\* cited by examiner

[Fig. 1]

PRIOR ART

[Fig. 2A]

PRIOR ART

[Fig. 2B]

PRIOR ART

[Fig. 2C]

PRIOR ART

RTM INJECTION METHOD AND MOULD USING SYMMETRIC ANTI-PINCHING SECTORS

CROSS-REFERENCE TO RELATED APPLICATION(S)

This patent application is a U.S. National Stage entry of International Application No. PCT/FR2021/050959, filed on May 26, 2021, now published as WO 2021/245340 A1, which claims priority to U.S. Provisional Application No. 63/034,549, filed on Jun. 4, 2020.

TECHNICAL FIELD

The present invention relates to the general field of manufacturing axisymmetric parts such as gas turbine casings.

PRIOR ART

In the aeronautical field, it is desired to reduce the mass of engine components while still maintaining their mechanical properties at a high level. For example, in an aeronautical turbine engine, the fan casing defining the contour of the air inlet stream of the engine and within which is housed the rotor supporting the blades of the fan is now produced of composite material.

The manufacture of a fan casing of composite material starts with the installation by winding of a fiber reinforcement on a mandrel, the profile of which molds itself to that of the casing to be produced. The fibrous reinforcement can be created, for example, by three-dimensional or multilayer weaving as described in patent U.S. Pat. No. 8,322,971. This fibrous reinforcement constitutes a tubular fibrous preform with flanges corresponding to the flanges of the casing. Manufacturing continues with the densification of the fibrous preform by a polymer matrix which consists of impregnating the preform with a resin and polymerizing the latter to obtain the final part.

The invention relates more particularly to the manufacturing mode where the impregnation of the fibrous preform is accomplished by the injection molding method called RTM (for resin transfer molding). According to this method, the fibrous preform is enclosed in a rigid mold with fixed geometry comprising a mandrel or drum on which the fibrous preform is wound and a counter-mold which is deposited on the fibrous preform and the shape of which corresponds to the axisymmetric part that it is desired to obtain, and the resin is injected under controlled pressure and temperature inside the mold after having brought together the walls of the two parts of the mold and having formed a vacuum in it if necessary. Once the resin is injected, its polymerization is carried out by heating the mold and after the injection and the polymerization, the final part is de-molded then trimmed to remove excess resin, and the chamfers are machined to obtain the desired part, a casing for example.

As the preform is oversized at the time of its winding on the mandrel, i.e. it has excess thickness relative to the theoretical thickness of the finished part, the closing of the mold also provides the function of final compacting of the preform to bring it to its final thickness.

Figure 1:
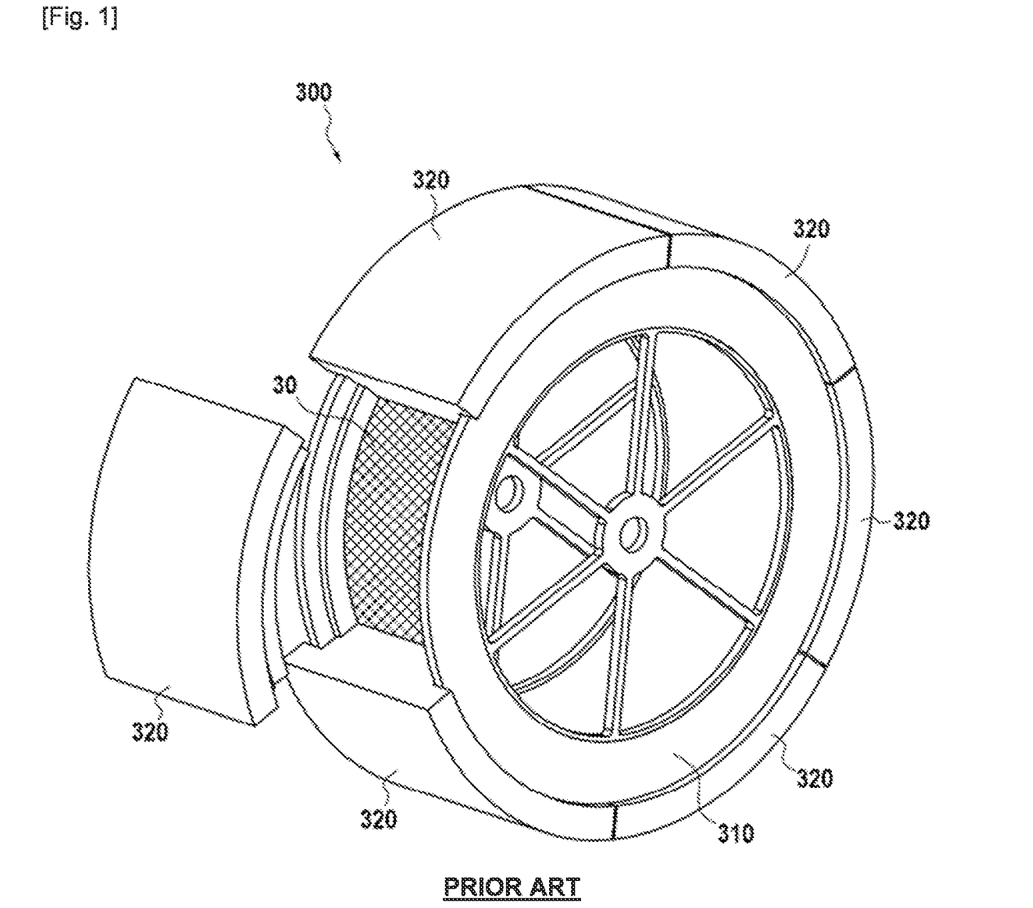
FIG. 1 is a schematic perspective view of an injection mold according to the prior art.

FIG. 1 illustrates an RTM injection mold 300 consisting of a drum or mandrel 310 on which is wound a fibrous preform 30 and a counter-mold formed by a plurality of angular sectors 320. The closing of the mold is accomplished by the angular sectors 320 which ensure the compacting of the preform. A method of closing a mold of this type is described in particular in document US 2018/370082.

Figure 2A:
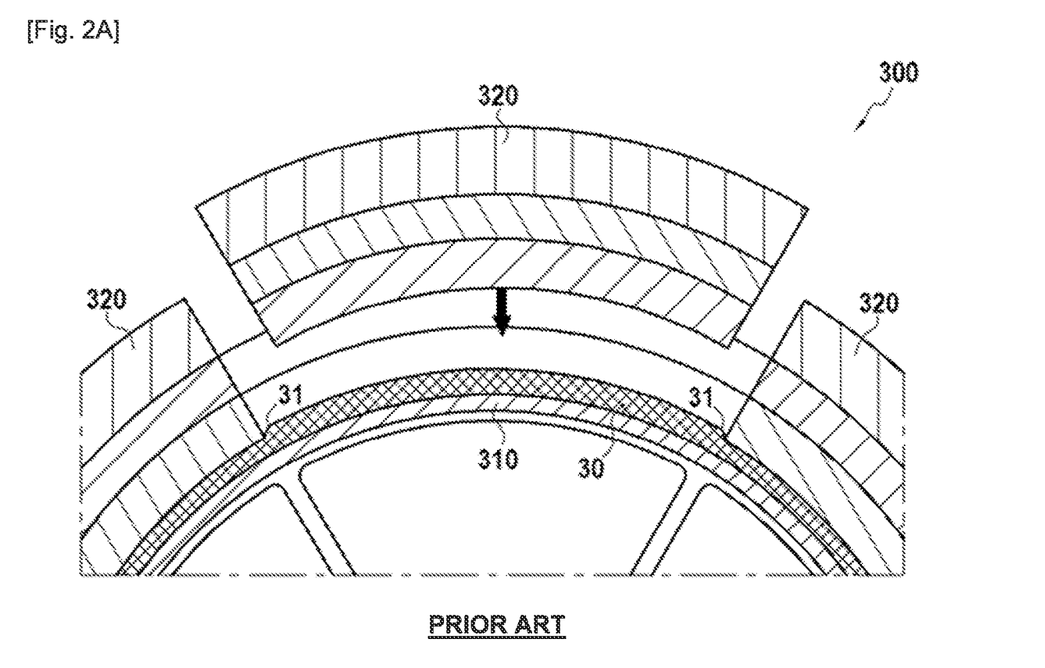
FIG. 2A is a partial radial section view showing a step of closing the mold of FIG. 1.
Figure 2B:
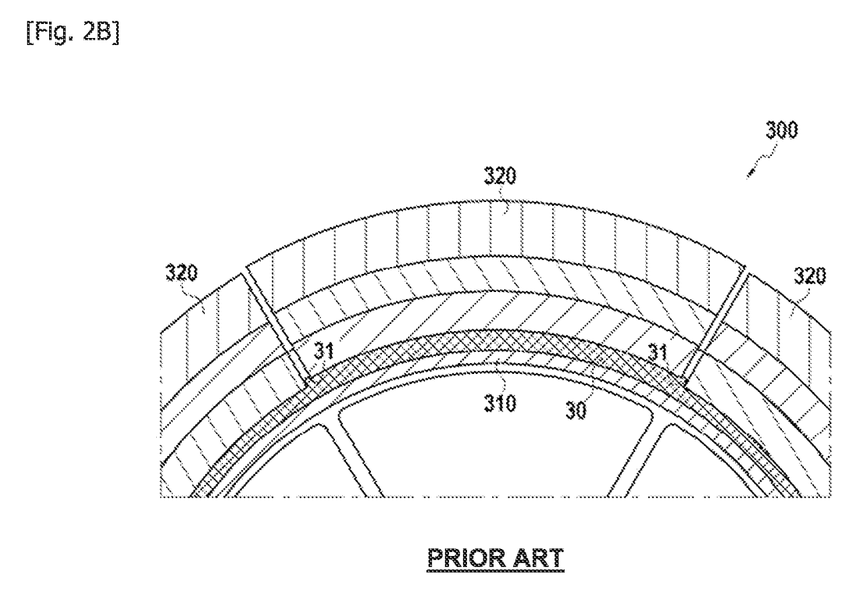
FIG. 2B is a partial view in radial section showing another step of closing the mold of FIG. 1.
Figure 2C:
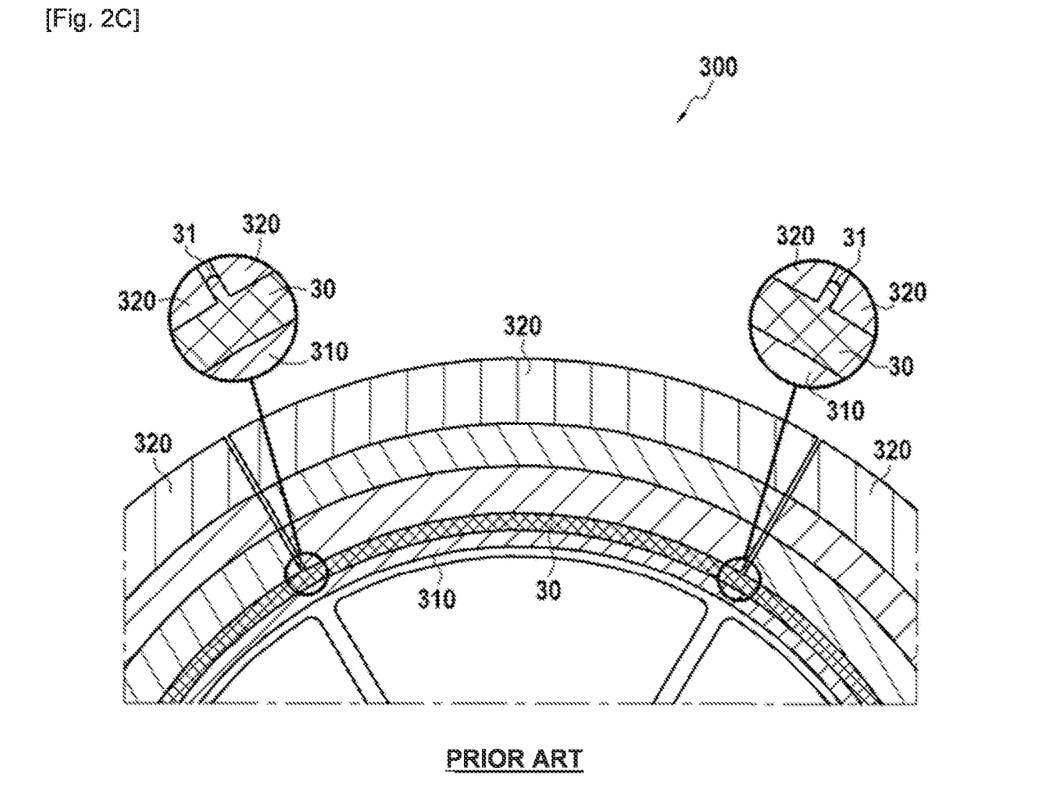
FIG. 2C is a partial view in radial section showing another step of closing the mold of FIG. 1.

However, the closing of the mold by angular sectors of this type proves to be a delicate operation. In fact, as illustrated in FIG. 2A, first one sector out of two is placed, each of which locally compacts the fibrous preform. The fibrous preform 30 has blisters 31 in proximity to the ends of each angular sector 320, because it is no longer compacted. The closing of the mold continues with the positioning of the remaining angular sectors between the sectors already positioned as illustrated in FIGS. 2B and 2C. During the installation of these sectors, the blisters 31 are driven out against the edges of the already positioned sectors because the preform is driven from the middle of the sector by the compaction. In addition, the shape of the sectors and the direction of closing of the mold ensure that there subsists a space between the sectors until the last moment of the closing of the mold. A part of the blisters 31 then penetrates into this space to be finally pinched between the edges of the adjacent sectors as shown in FIG. 2C. The fibers of the preform thus pinched can cause a deterioration of the mold, poor sealing of it and especially the creation of faults called "pinch fibers" on the finished part.

DISCLOSURE OF THE INVENTION

The invention has as its object to propose a solution which avoids pinching of the fibers of a preform during the closing of an injection mold.

This object is achieved in particular thanks to an injection mold for the manufacture of an axisymmetric part of composite material comprising:
  a mandrel intended to support a fibrous preform formed by winding, the mandrel comprising an annular wall the profile of the outer surface of which corresponds to that of the inner surface of the part to be manufactured,
  a plurality of counter-mold angular sectors assembled on the mandrel and intended to close the mold and to compact the fibrous preform wound on the mandrel, each angular sector comprising an annular base intended to come into contact with the fibrous preform, the annular base extending between the first and second longitudinal edges in an axial direction and between the first and second lateral edges in a circumferential direction, the first lateral edge of the annular base of an angular sector being in contact with a second lateral edge of the annular base of an adjacent angular sector,
characterized in that the plurality of angular sectors comprises a first series of angular sectors and a second series of angular sectors, the first and second lateral edges of each angular sector of the first series of angular sectors each including a protruding lower portion forming a first nonzero angle relative to a radial direction, the first and second lateral edges of each angular sector of the second series of sectors each including a recessed lower portion forming a second nonzero angle relative to a radial direction, the first angle and the second angle having the same extent.

The lower portions, respectively protruding and recessed, present on each angular sector will allow pushing or "chasing" away the preform portion which blisters outside the lateral edge of the angular sector. As the part of the lateral edges of each angular sector in contact with the fibrous preform, namely the lower protruding and recessed portions, are parallel to the closing direction i.e. parallel to the radial direction in the middle of the sector, there is no space between the two sectors at the time of closing. The risk of pinching the yarns and, consequently, the preform, is thus considerably reduced. It is thus possible to compact a preform with each of the angular sectors without risking pinching it at the junction between two adjacent sectors.

According to one particular feature of the mold of the invention, each angular sector of the first and second series of sectors includes a first lateral face parallel to the radial direction and present in the continuation of the first lateral edge of the annular base and a second lateral face parallel to the radial direction and present in the continuation of the second lateral edge of the annular base. This allows having less protruding angles.

According to yet another particular features of the mold of the invention, the first nonzero angle relative to the radial direction formed by the protruding lower portion of the lateral edges of an angular sector of the first series of sectors is comprised between 18° and 45°.

The invention also has as its object a method of closing an injection mold for the manufacture of an axisymmetric part of composite material, the mold comprising:
 a mandrel supporting the fibrous preform obtained by winding a fibrous strip, the mandrel comprising an annular wall of which the profile of the outer surface corresponds to that of the inner surface of the part to be manufactured,
 a plurality of angular sectors comprising an annular base intended to come into contact with the fibrous texture, the annular base extending between the first and second longitudinal edges in an axial direction and between the first and second lateral edges in a circumferential direction,
characterized in that the plurality of angular sectors comprises a first series of angular sectors and a second series of angular sectors, the first and second lateral edges of each angular sector of the first series of sectors each including a protruding lower portion forming a first nonzero angle relative to a radial direction, the first and second lateral edges of each angular sector of the second series of sectors each including a recessed lower portion forming a second nonzero angle relative to a radial direction, the first angle and the second angle having the same extent, and in that the method comprises the successive positioning and attachment of each angular sector to the mandrel, the annular base of each sector compacting the fibrous preform portion present facing it, the lateral edges of the annular base of an angular sector of the first series of sectors during positioning being held in contact with the lateral edges of the annular base of angular sectors of the second series of sectors already attached to the mandrel.

According to a particular feature of the method of the invention, the angular sectors of the second series of sectors are first positioned and attached to the mandrel at a predetermined distance from one another so as to provide a space between two angular sectors of the second series of sectors, the angular sectors of the first series of sectors then being positioned and attached to the mandrel in the spaces provided between the angular sectors of the second series of sectors.

According to another particular feature of the method of the invention, each angular sector of the first and second series of sectors includes a first lateral face parallel to the radial direction and present in the continuation of the first lateral edge of the annular base and a second lateral face parallel to the radial direction and present in the continuation of the second lateral edge of the annular base.

According to another particular feature of the method of the invention, the first nonzero angle relative to the radial direction formed by the protruding lower portion of the lateral edges of an angular sector of the first series of sectors is comprised between 18° and 45°.

DESCRIPTION OF THE EMBODIMENTS

The invention applies generally to any gas turbine casing of organic matrix composite material.

The invention will be described hereafter within the scope of its application to a fan casing of an aeronautical gas turbine engine.

Figure 3:
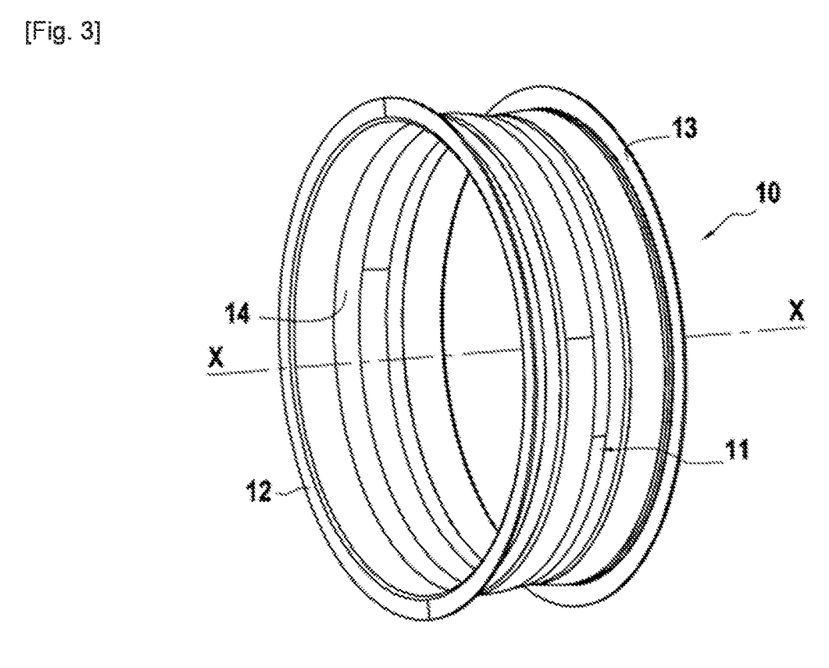
FIG. 3 is a schematic perspective view of a fan casing of composite material.

FIG. 3 shows a perspective view of a fan casing 10 which can be manufactured using a mold and a method according to the invention. A casing of this type is centered on a longitudinal axis X-X and comprises an annular wall 11 delimited upstream by an upstream flange 12 and downstream by a downstream flange 13 (upstream and downstream being defined relative to the flow direction of the gas flow in a gas turbine). The inner surface 14 of the annular wall 11 is intended to delimit the air inlet stream in the gas turbine or to support the panels, shells, etc. which define this stream.

Figure 4:
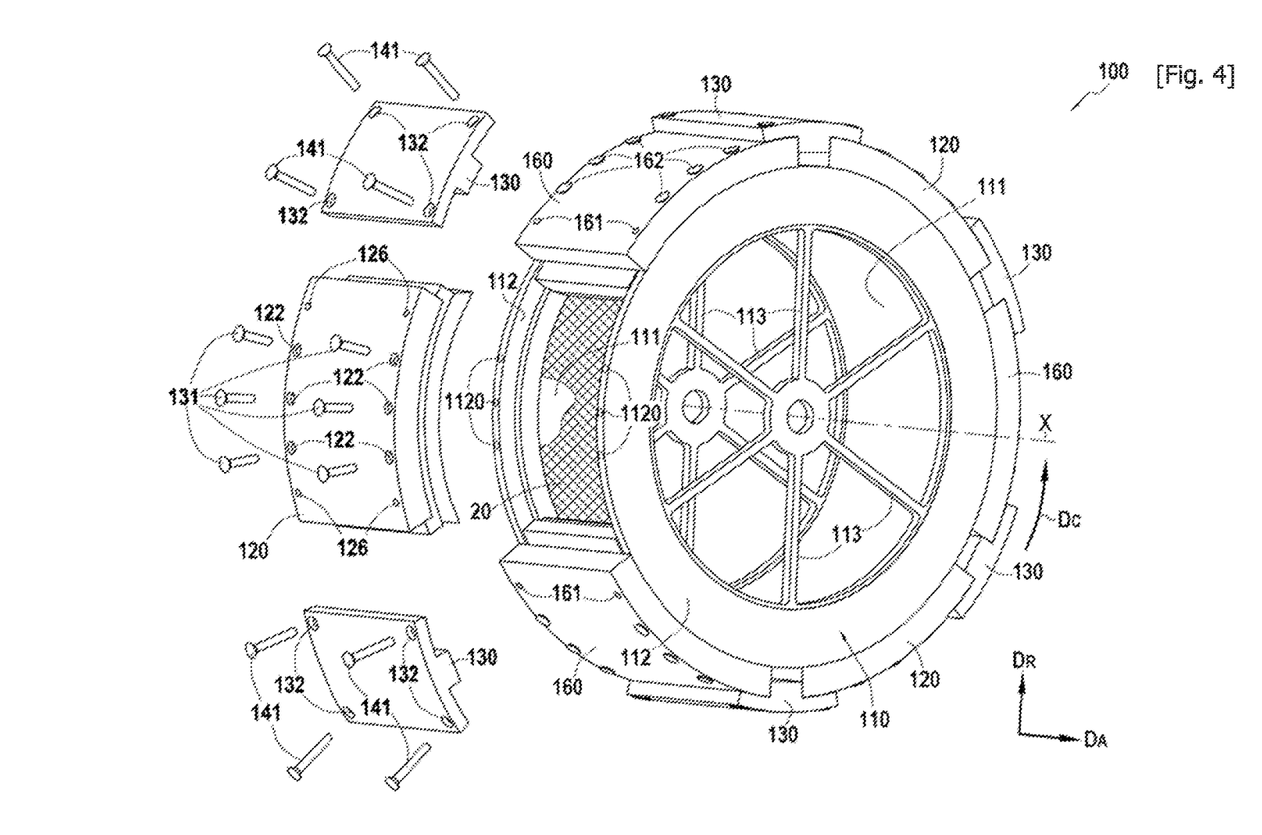
FIG. 4 is a schematic perspective view of an injection mold in conformity with an embodiment of the invention.

FIG. 4 is a schematic perspective view of a mold according to the invention during closing. A mold of this type can be used for impregnation by a method of the RTM ("resin transfer molding") type of a fibrous preform in order to manufacture a fan casing 10 like that previously presented. The fibrous preform can be created by three-dimensional weaving of a fibrous texture in the form of a strip with fibers, for example carbon, glass, aramid or ceramic, and the impregnation matrix can be a polymer, for example epoxy, bismaleimide or polyimide.

The mold 100 is mounted in rotation on a drive shaft (not shown) centered on the axis X-X, and comprises a mandrel 110. Hereafter, the axial $D_A$ and radial $D_R$ directions will be defined relative to this axis X-X, the axial direction $D_A$ being parallel to the axis X-X and the radial direction $D_R$ being perpendicular to the axis X-X. Reference will also be made to a circumferential direction $D_C$ which, as shown in FIG. 4, corresponds to a direction which is tangent to any circle centered on the axis X-X. This direction is perpendicular both to the axial direction $D_A$ and to a radial direction $D_R$.

The mandrel 110 comprises an annular wall 111 taking the shape of a drum supporting a fibrous preform 20 formed by winding a fibrous strip, and two lateral flanges 112. The mandrel 110 is retained on its drive shaft by means of spokes 113.

The flanges 112 form a support intended to receive the folded-back parts of the preform 20 wound on the mandrel 110, and which are intended to form the upstream 12 and downstream 13 flanges of the fan casing 10.

The mold 100 further comprises a counter-mold consisting of a plurality of angular sectors 120 and 160 assembled in a sealed manner on the mandrel 110, and locked together in a sealed manner by locking keys 130 which maintain a flat seal between the sectors (not shown in FIG. 4). According to one variant embodiment, the sectors can be directly locked together by bolting by using oblique screws. In this case, sealing between the sectors is accomplished by compaction of a seal housed in the grooves present on the lateral edges of the sectors as explained hereafter.

More precisely, the plurality of angular sectors comprises a first series of angular sectors 120 (three in number here) and a second series of angular sectors 160 (three in number here) positioned alternately around the mandrel 110.

The angular sectors, respectively 120 and 160 are assembled on the lateral flanges 112 by clamping screws 131 passing in openings, respectively 122 and 162 present in the sectors and screwed into tapped holes 1120 present on the lateral flanges 112. The screws 131 allow the assembly of the sectors 120 and 160 on the flanges 112 and the adjustment of the compaction pressure which is applied to the fibrous preform 20. The tapped holes can be replaced by nuts inserted into the cages, which facilitates maintenance in the case of an aluminum mold.

In the example described here, the angular sectors 120 and 160 are locked together by clamping screws 141 passing in openings 132 present in the locking keys 130 and screwed into tapped holes, respectively 126 and 161 present in the angular sectors 120 and 160. A key 130 is attached between two adjacent sectors 120 and 160 by two rows of screws 141 extending longitudinally on the ends of each sector. The assembly of the locking keys 130 is accomplished radially from the outside, once the sectors are assembled on the mandrel 110. In this manner, the keys ensure circumferential clamping of the sectors 120 and 160 to one another.

O ring seals (not shown) positioned on the flanges 112 ensure sealing between the sectors 120 and 160 and the mandrel 110.

Figure 5:
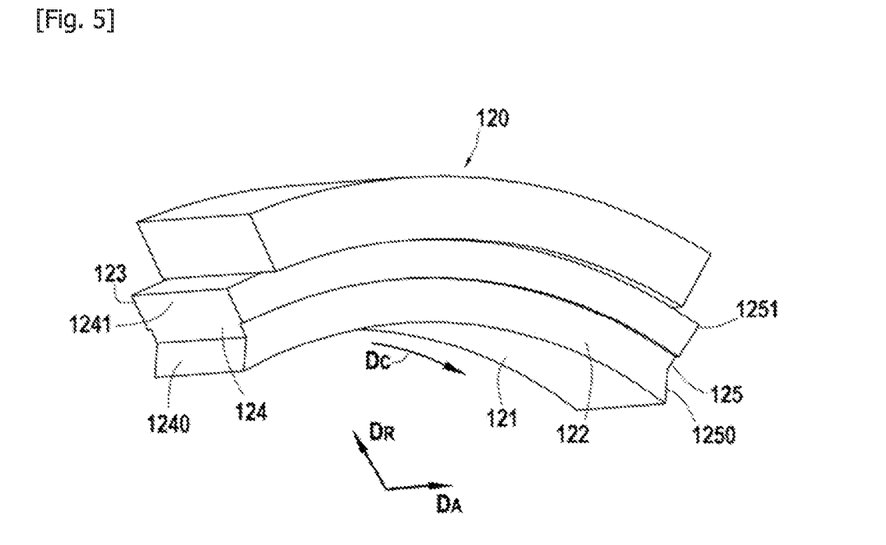
FIG. 5 is a schematic perspective view showing an angular sector of a first series of sectors of the mold of FIG. 4.

FIG. 5 illustrates an angular sector 120 of the first series of angular sectors in conformity with an embodiment of the invention. Each angular sector 120 comprises an annular base 121 intended to come into contact with the fibrous texture 20. The annular base extends between the first and second longitudinal edges 122 and 123 in the axial direction $D_A$ and between the first and second lateral edges 124 and 125 in the circumferential direction $D_C$, the first lateral edge 124 of the annular base 121 of an angular sector 120 being in contact with a second lateral edge 165 of the annular base of an adjacent angular sector 160 of the second series of angular sectors, while the second lateral edge 125 of the annular base 121 of an angular sector 120 is in contact with a first lateral edge 164 of the annular base of an adjacent angular sector 160 of the second series of angular sectors (FIG. 8C). The first lateral edge 124 of the annular base 121 of each angular sector 120 includes a protruding lower portion 1240 in the form of a slope forming a first nonzero angle $\beta_{1240}$ relative to a radial direction $D_R$. Likewise, the second lateral edge 125 of the annular base 121 of each angular sector includes a protruding lower portion 1250 in the form of a slope forming a second nonzero angle $\beta_{1250}$ relative to the radial direction $D_R$, the first and second angles $\beta_{1240}$ and $\beta_{1250}$ having the same extent (FIG. 8A).

Figure 6:
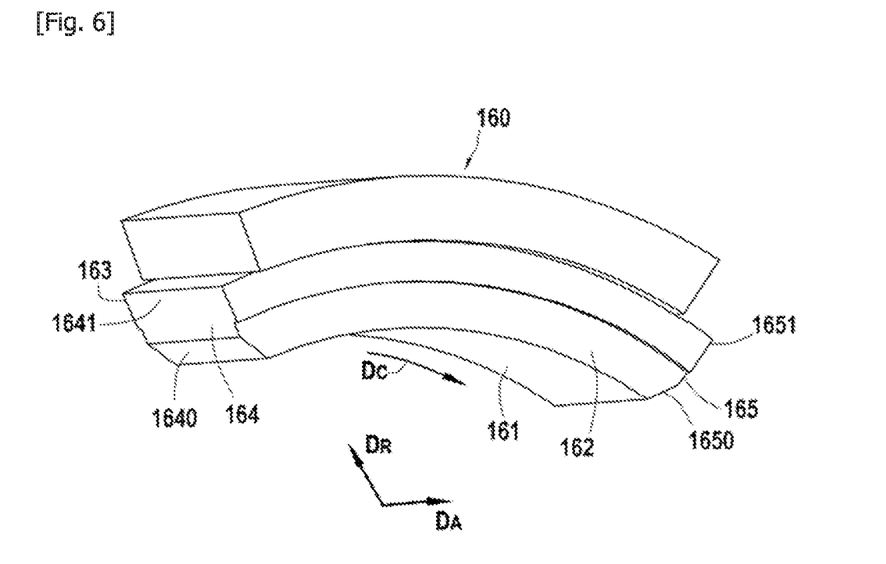
FIG. 6 is a schematic perspective view showing an angular sector of a second series of sectors of the mold of FIG. 4.

FIG. 6 illustrates an angular sector 160 of the second series of angular sectors in conformity with an embodiment of the invention. Each angular sector 160 comprises an annular base 161 intended to come into contact with the fibrous texture 20. The annular base extends between the first and second longitudinal edges 162 and 163 in the axial direction $D_A$ and between the first and second lateral edges 164 and 165 in the circumferential direction $D_C$, the first lateral edge 164 of the annular base 161 of an angular sector 160 being in contact with a second lateral edge 125 of the annular base of an adjacent angular sector 120 of the first series of angular sectors, while the second lateral edge 165 of the annular base 161 of an angular sector 160 is in contact with a first lateral edge 124 of the annular base of an adjacent angular sector 120 of the first series of angular sectors (FIG. 8C). The first lateral edge 164 of the annular base 161 of each angular sector 160 includes a recessed lower portion 1640 in the form of a slope forming a first nonzero angle $\beta_{1640}$ relative to a radial direction $D_R$. Likewise, the second lateral edge 165 of the annular base 161 of each angular sector includes a recessed lower portion 1650 in the form of a slope forming a second nonzero angle $\beta_{1650}$ relative to the radial direction $D_A$, the first and second angles $\beta_{1640}$ and $\beta_{1650}$ having the same extent (FIG. 8A). The angles $\beta_{1240}$, $\beta_{1250}$, $\beta_{1640}$ and $\beta_{1650}$ all have the same extent.

Figure 7:
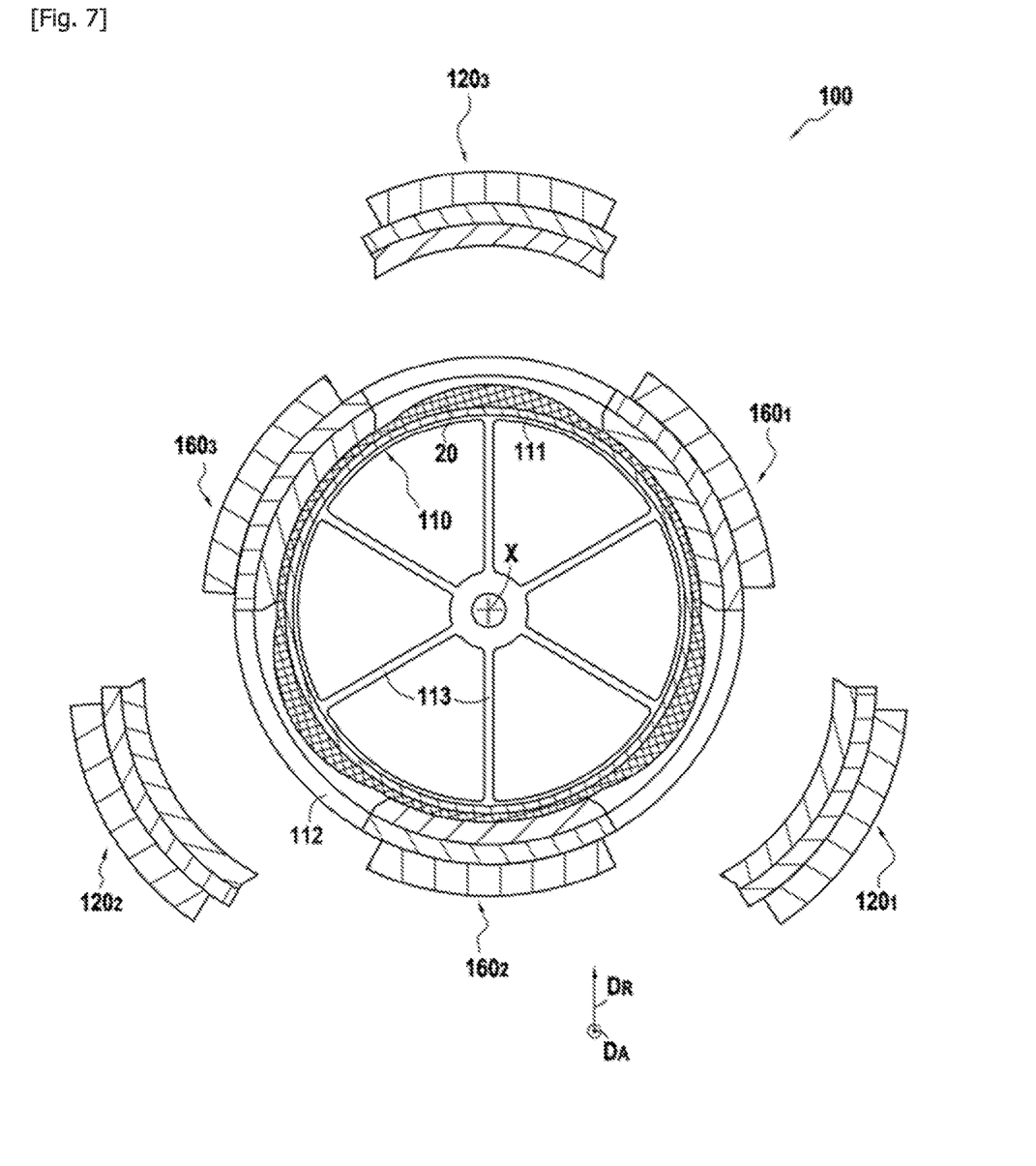
FIG. 7 is a radial section view of the injection mold of FIG. 4, with a first series of angular sectors positioned.

FIG. 7 illustrates a method of closing the mold 100 with angular sectors 120 of the first series of sectors and angular sectors 160 of the second series of sectors, in conformity with an embodiment of the invention. In this embodiment, the angular sectors 160 of the second series of sectors are positioned first of all. After having compacted the preform 20, the angular sectors 160 are attached to the mandrel 110 of the mold 100 at positions spaced from one another so as to allow the insertion of the angular sectors 120 of the first series of sectors between two angular sectors 160 during the finalization of the closing of the mold. Once the angular sectors 160 are positioned and attached on the mandrel 100, the angular sectors 120 of the first series of sectors are placed and attached.

Figure 8A:
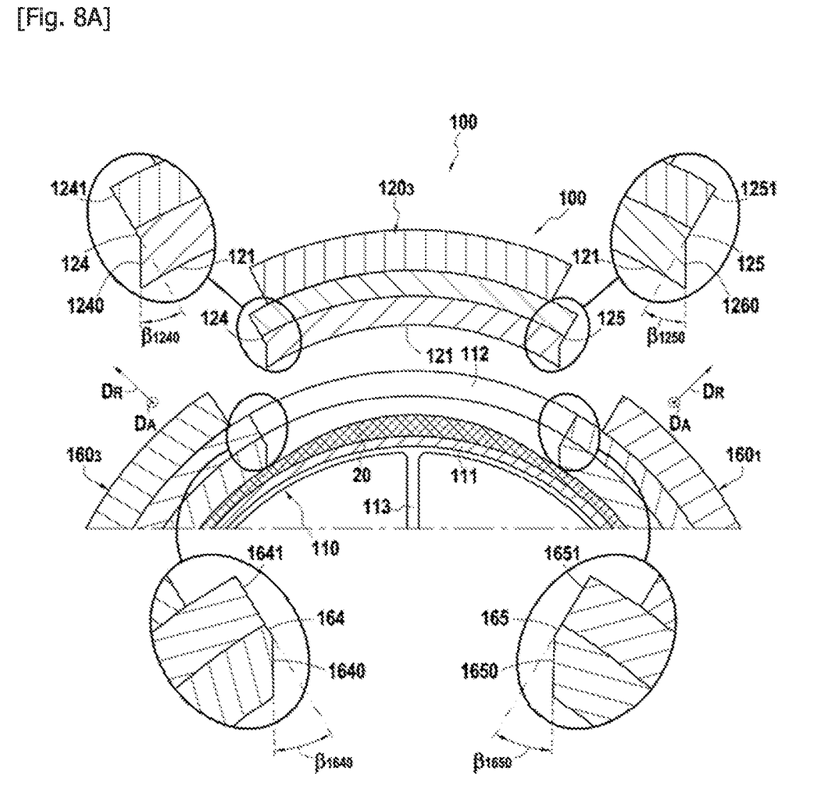
FIG. 8A is a partial radial section view showing the beginning of the positioning of an angular sector during the closing of the mold of FIG. 4.
Figure 8B:
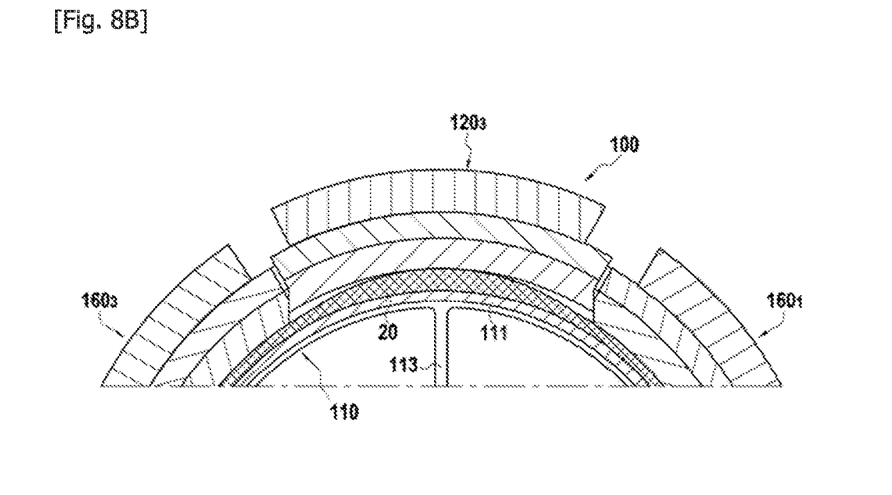
FIG. 8B is a partial radial section view showing the progression of the positioning of the angular sector of FIG. 8A.
Figure 8C:
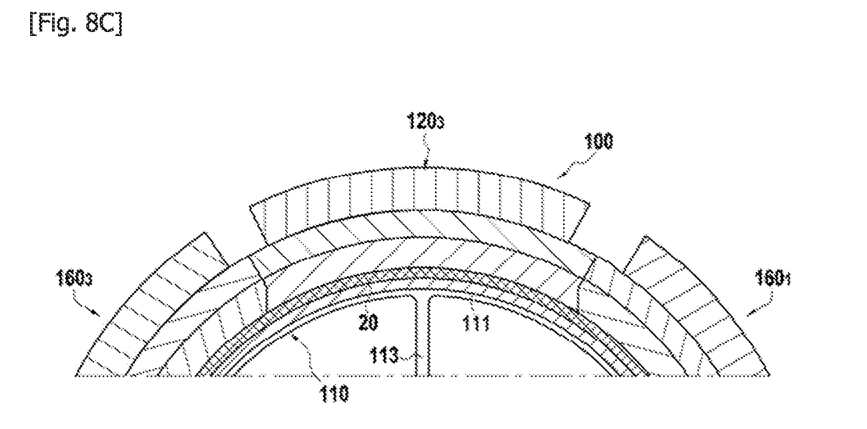
FIG. 8C is a partial radial section view showing the mold of FIG. 4 closed.

FIGS. 8A to 8C illustrate the positioning of an angular sector 120 of the first series of sectors during the finalization of the closing of the mold 100. More precisely, in FIG. 8A, a final angular sector $120_3$ of the first series is being positioned between two angular sectors $160_1$ and $160_3$ of the second series, already positioned, in order to finalize the closing of the mold 100. Thanks to its protruding configuration and its contact with the complementary recessed portion of the adjacent sector during positioning of the sector $120_3$, the protruding lower portions 1240 and 1250, present respectively on the lateral edges 124 and 125 of the sector, will push or "chase" away the portion of the preform 20 which blisters outside the lateral edge 165 of the angular sector $160_3$ and the portion of the preform 20 which blisters outside the lateral edge 164 of the angular sector $160_1$. As the part of the lateral edges of each angular sector in contact with the fibrous preform 20, namely the lower protruding portions 1240 and 1250 and the lower recessed portions

1640 and 1650 are parallel to the closing direction, i.e. parallel to the radial direction $D_R$ in the middle of the sector, there is no space between the two sectors at the moment of closing. Thus the risk of pinching these yarns, and consequently the preform, is considerably reduced.

In FIG. 8B, it is observed that the protruding portions 1240 and 1250 of the angular sector 120₃ are in contact with the recessed portions 1640 and 1650 respectively of the angular sectors 160₁ and 160₃ starting at the beginning of the installation of the angular sector 120₃. This very early contacting during the positioning of the sector is made possible by the cooperation of two lateral edges having respectively one recessed portion and one protruding portion as described above, the two lower portions having complementary slopes.

It is thus possible to compact the preform 20 with each of the angular sectors 120 without risking pinching it between two adjacent sectors as shown in FIG. 8C.

Each angular sector 120, respectively 160, further includes a first lateral face 1241, respectively 1641 parallel to the radial direction $D_R$ and present in the continuation of the first lateral edge 124, respectively 164 of the annular base 121, respectively 161, and a second lateral face 1251, respectively 1651, parallel to the radial direction $D_R$ and present in the continuation of the second lateral edge 125, respectively 165, of the annular base 121, respectively 161.

According to a particular feature of the invention, the first nonzero angles $\beta_{1240}$ and $\beta_{1250}$ relative to the radial direction formed by the protruding lower portions 1240 and 1250 respectively of the first and second lateral edges 124 and 125 of an angular sector 120 is comprised between 18° and 45°.

The manufacture of the casing 10 shown in FIG. 3 starts with the creation of a fibrous texture by three-dimensional weaving of the warp yarns and of the weft yarns. What is meant here by "three-dimensional weaving" or "3D weaving" is a weaving mode by which some at least of the weft yarns link to the warp yarns on several layers of warp yarns, or conversely. The fibrous texture can have an interlock weaving pattern. What is meant here by "interlock" weaving is a weaving pattern in which each layer of weft yarns connects several layers of warp yarns, with all the yarns of the same weft column having the same movement in the plane of the pattern. Other weaving patterns can be considered. The yarns used can in particular be carbon fiber, glass or silicon carbide yarns. The fibrous texture has the shape of a strip which is wound in several turns on the mandrel 110 of the mold 110 to form the fibrous preform 20.

The mold 100 is then closed by means of the angular sectors 120 and 160 described previously, these sectors further accomplishing the compacting of the preform 20.

The densification of the fibrous preform is then undertaken, which consists of filling the porosity of the latter with the material constituting the matrix. To this end, the matrix precursor liquid, a resin for example is injected into the entire preform present in the mold. The transformation of the precursor into an organic matrix, namely its polymerization, is accomplished by thermal treatment, generally by heating the mold, after elimination of solvent, if any, and curing of the polymer, the preform being constantly held in the mold having a shape corresponding to that of the part to be produced. The organic matrix can in particular be obtained from epoxy resins, such as for example the high-performance epoxy resin sold or liquid precursors of carbon or ceramic matrices.

The densification of the fibrous preform can be accomplished by the well-known method of transfer molding called RTM ("resin transfer molding") which consists of injecting a thermosetting resin into the internal space of the mold containing the fibrous preform, a pressure gradient being generally established in this internal space between the location where the resin is injected and the outlets of the latter in order to control and optimize the impregnation of the preform by the resin. Once the resin is injected into the entire preform, its polymerization is undertaken by thermal treatment in conformity with the RTM method.

After injection and polymerization, the part is de-molded. The part is finally trimmed to remove excess resin and the chamfers are machined to obtain a casing 10 having an axisymmetric shape as illustrated in FIG. 3.

The invention claimed is:

1. An injection mold for the manufacture of an axisymmetric part of composite material comprising:
a mandrel configured to support a fibrous preform formed by winding, the mandrel comprising an annular wall having an outer surface and an inner surface, a profile of the outer surface corresponding to a profile of the inner surface of the part to be manufactured,
a plurality of counter-mold angular sectors assembled on the mandrel and intended to form the mold and to compact the fibrous preform wound on the mandrel, each angular sector comprising:
an annular base intended to come into contact with the fibrous preform, the annular base extending between first and second longitudinal edges in an axial direction and between first and second lateral edges in a circumferential direction,
the first lateral edge of the annular base of one of the angular sectors being in contact with the second lateral edge of the annular base of the adjacent angular sector,
wherein the plurality of angular sectors comprises a first series of angular sectors and a second series of angular sectors, the first and second lateral edges of each angular sector of the first series of sectors each including a protruding lower portion forming a first nonzero angle relative to a radial direction, the first and second lateral edges of each angular sector of the second series of sectors each including a recessed lower portion forming a second nonzero angle relative to a radial direction, the first angle and the second angle having the same extent, wherein the plurality of angular sectors further includes a first lateral face parallel to the radial direction and present in the continuation of the first lateral edge of each angular sector, and a second lateral face parallel to the radial direction and present in the continuation of the second lateral edge of each angular sector.

2. The injection mold according to claim 1, wherein each angular sector includes a first groove and a second groove present respectively on the first lateral face and the second lateral face, the first groove and the second groove extending in the axial direction, a gasket being housed between the first groove of the first lateral face of the angular sector and the second groove of the second lateral face of the adjacent angular sector.

3. The injection mold according to claim 1, wherein the first nonzero angle relative to the radial direction formed by the protruding lower portion of the first and second lateral edges of an each angular sector of the first series of sectors is between 18° and 45°.

4. A method of closing an injection mold for the manufacture of an axisymmetric part of composite material, the mold comprising:

a mandrel supporting a fibrous preform obtained by winding a fibrous strip, the mandrel comprising an annular wall having an outer surface and an inner surface, a profile of the outer surface corresponding to a profile of the inner surface of the part to be manufactured, a plurality of angular sectors comprising an annular base intended to come into contact with the fibrous preform, the annular base extending between first and second longitudinal edges in an axial direction and between first and second lateral edges in a circumferential direction, wherein the plurality of angular sectors each comprises a first series of angular sectors and a second series of angular sectors, the first and second lateral edges of each angular sector of the first series of sectors each including a protruding lower portion forming a first nonzero angle relative to a radial direction, the first and second lateral edges of each angular sector of the second series of sectors each including a recessed lower portion forming a second nonzero angle relative to a radial direction, wherein the plurality of angular sectors further includes a first lateral face parallel to the radial direction and present in the continuation of the first lateral edge of each angular sector, and a second lateral face parallel to the radial direction and present in the continuation of the second lateral edge of each angular sector, the first angle and the second angle having the same extent and wherein the method comprises successive positioning and attachment of each angular sector on the mandrel, the annular base of each sector compacting the fibrous preform portion facing the annular base, the lateral edges of the annular base of an angular sector of the first series of sectors during positioning being held in contact with the lateral edges of the annular base of the angular sectors of the second series of sectors already attached to the mandrel.

5. The method according to claim 4, wherein the angular sectors of the second series of sectors are first positioned and fixed on the mandrel at a predetermined distance from one another so as to provide a space between two angular sectors of the second series of sectors, the angular sectors of the first series of sectors then being positioned and attached to the mandrel in the spaces provided between the angular sectors of the second series of sectors.

6. The method according to claim 4, wherein the first nonzero angle relative to the radial direction formed by the protruding lower portion of the first and second lateral edges of an each angular sector of the first series of sectors is between 18° and 45°.

* * * * *